United States Patent Office 3,806,351
Patented Apr. 23, 1974

3,806,351
PIGMENT DISPERSION COMPOSITION
Herbert Bromberg, 850 Locust, Winnetka, Ill. 60093;
Mengchien Clarence Huang, 1515 Bowling Green
Drive, Lake Forest, Ill. 60045; and Karl Maurice
Beck, 224 E. Sheridan Road, Lake Bluff, Ill. 60044
No Drawing. Filed Feb. 7, 1973, Ser. No. 330,380
Int. Cl. C08h 17/14
U.S. Cl. 106—308 Q                 15 Claims

ABSTRACT OF THE DISCLOSURE

An improved pigment dispersion containing a diiodomethyl sulfone of the formula

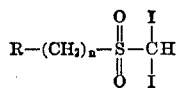

as the preservative agent.

---

Organic pigment dispersions are subject to in-can preservation problems. That is, the organic pigment dispersions spoil and discolor due to bacterial and fungicidal attack. In the past, such compositions have been protected from attack by various mercurial preservative agents. However, in view of the toxicity of the mercury-containing compounds, various governmental agencies have been hesitant in approving new agents and have taken steps to remove existing agents from the market. Therefore, the search has continued for improved biocides which will protect organic pigment dispersions such as dispersions useful in the manufacture of paint, textile pigments, printing inks, and the like. This invention provides such a biocide, provides methods for preserving organic pigment dispersions, and further provides further improved pigment dispersion compositions.

Organic pigment dispersions are formulated in aqueous solutions comprising from 15 to 30% of pigment, for 20 to 35% of surfactants for dispersion, and the remainder of the composition being water. The organic pigments are such that they nourish bacterial and fungal growth, both in the can and while enroute to the supplier. If an organic surfactant is used, both the surfactant and the pigment will nourish bacterial and fungal growth.

In the past, various biocides, mainly mercurial biocides, have been used in preserving such pigment dispersions. However, with the recent decline in favor with government agencies with mercury-containing compounds, the search for improved biocides which are non-mercurial have continued. The present invention provides such a biocide.

In the practice of this invention, from 25 to 50,000 parts per million of a diiodomethyl sulfone represented by the formula

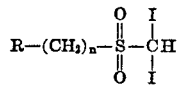

wherein R is selected from the group consisting of alkyl, phenyl, loweralkylphenyl, monohalophenyl, polyhalophenyl, nitrophenyl, halonitrophenyl, nitroloweralkylphenyl, haloloweralkylphenyl, polyloweralkylphenyl, analimidophenyl, or analinophenyl, and n is an integer from 0 to 4.

Representative diiodomethyl sulfones which are useful in the practice of this invention include:

4-tolyl diiodomethyl sulfone
phenyl diiodomethyl sulfone
4-(methylamido)-phenyl diiodomethyl
n-heptyl diiodomethyl sulfone
4-aminophenyl diiodomethyl sulfone
4-chlorophenyl diiodomethyl sulfone
4-t-butyl-phenyl diiodomethyl sulfone
3-tolyl diiodomethyl sulfone
2-tolyl diiodomethyl sulfone
4-bromophenyl diiodomethyl sulfone
2-methyl-4-chlorophenyl diiodomethyl
alphanaphthyl diiodomethyl sulfone
2-methyl-4-bromophenyl diiodomethyl
3-methyl-4-bromophenyl diiodomethyl
n-butyl diiodomethyl sulfone
benzyl diiodomethyl sulfone
2,4-dimethylphenyl diiodomethyl sulfone
3,4-dichlorophenyl diiodomethyl sulfone
4-methylphenyl diiodomethyl sulfone
t-butyl diiodomethyl sulfone
benzyl iodomethyl sulfone
ethyl iodomethyl sulfone
2-methyl-4-butylphenyl diiodomethyl
4-chlorobenzyl diiodomethyl sulfone
4-nitrophenyl diiodomethyl sulfone
2-nitro-4-chlorophenyl diiodomethyl sulfone
2-isopropylphenyldiiodomethyl sulfone
cyclohexyl diiodomethyl sulfone
n-pentyl diiodomethyl sulfone
n-hexyl diiodomethyl sulfone
n-propyl diiodomethyl sulfone
n-octyl diiodomethyl sulfone
4-methylbenzyl diiodomethyl sulfone
bromobenzyl diiodomethyl sulfone
4-methoxybenzyl diiodomethyl sulfone
3-chlorobenzyl diiodomethyl sulfone
3,5-dimethyl diiodomethyl sulfone
1-phenyl-2-(diiodomethylsulfonyl) ethane
3-bromobenzyl diiodomethyl sulfone
2-naphthylmethyl-diiodomethyl sulfone
1-phenyl-3-(diiodomethylsulfonyl)propane
isobutyl diiodomethyl sulfone
3,4-dimethylbenzyl diiodomethyl sulfone
3,3-dimethylpropyl diiodomethyl sulfone
2,2,4,4-tetramethylbutyl diiodomethyl The presently preferred agents are 4-methylphenyl diiodomethyl sulfone and 4-chlorophenyl diiodomethyl sulfone.

In the practice of this invention, pigment dispersions which are commercially available for use in paint manufacture, printing for textiles, printing inks, and the like are improved by the addition of from 25 to 50,000 parts per million of one of the compounds useful in the practice of this invention. The presently preferred range is from 250 to 10,000 parts per million by weight of a diiodomethyl sulfone being the presently preferred amount incorporated into such compositions.

The compounds useful in the practice of this invention can be prepared according to the methods described in U.S. Pat. No. 3,632,859.

We claim:
1. An improved pigment dispersion composition comprising from 15 to 30% by weight of an organic pigment, from 20 to 35% by weight of surfactant and from 25 to 50,000 per million by weight of a diiodomethyl sulfone of the formula

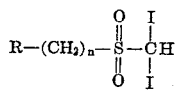

wherein R is selected from the group consisting of alkyl, phenyl, loweralkylphenyl, monohalophenyl, polyhalophenyl, nitrophenyl, halonitrophenyl, nitroloweralkylphenyl, haloloweralkylphenyl, polyloweralkylphenyl, analimidophenyl, or analinophenyl, and $n$ is an integer from 0 to 4, and water to 100%.

2. The pigment dispersion composition of claim 1 wherein said diiodomethyl sulfone is present in a range of from 25 to 50,000 parts per million by weight.

3. The pigment dispersion composition of claim 1 wherein said diiodomethyl sulfone is present in an amount of 250 to 10,000 parts per million by weight.

4. The pigment dispersion composition of claim 1 wherein the diiodomethyl sulfone is 4-methylphenyl diiodomethyl sulfone.

5. The pigment dispersion composition of claim 1 wherein the diiodomethyl sulfone is 4-chlorophenyl diiodomethyl sulfone.

6. The pigment dispersion composition of claim 2 wherein the diiodomethyl sulfone is 4-methylphenyl diiodomethyl sulfone.

7. The pigment dispersion composition of claim 2 wherein the diiodomethyl sulfone is 4-chlorophenyl diiodomethyl sulfone.

8. The pigment dispersion composition of claim 3 wherein the diiodomethyl sulfone is 4-methylphenyl diiodomethyl sulfone.

9. The pigment dispersion composition of claim 3 wherein the diiodomethyl sulfone is 4-chlorophenyl diiodomethyl sulfone.

10. A method of protecting organic pigment dispersions from bacterial and fungal attack comprising incorporating a biocidally effective amount of a diiodomethyl sulfone represented by the formula

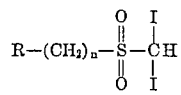

wherein R is selected from the group consisting of alkyl, phenyl, loweralkylphenyl, monohalophenyl, polyhalophenyl, nitrophenyl, halonitrophenyl, nitroloweralkylphenyl, haloloweralkylphenyl, polyloweralkylphenyl, analimidophenyl, or analinophenyl, and $n$ is an integer from 0 to 4, into said pigment dispersion composition.

11. The method of claim 10 wherein said diiodomethyl sulfone is incorporated at a rate of from 25 to 50,000 parts per million by weight.

12. Claim in accordance with claim 10 wherein said diiodomethyl sulfone is incorporated into said pigment dispersion composition at a rate of from 25 to 500 parts per million.

13. A method in accordance with claim 10 wherein said diiodomethyl sulfone is incorporated into said pigment dispersion composition at a rate of from .025 percent by weight.

14. A method in accordance with claim 10 wherein said diiodomethyl sulfone is 4-methylphenyl diiodomethyl sulfone.

15. The method of claim 10 wherein said diiodomethyl sulfone is 4-chlorophenyl diiodomethyl sulfone.

References Cited
UNITED STATES PATENTS 3,657,353    4/1972    Crovetti et al. _____ 260—607 A
3,663,623    5/1972    Crovetti et al. _____ 260—607 A DELBERT E. GANTZ, Primary Examiner
J. V. HOWARD, Assistant Examiner